(12) United States Patent
Browen

(10) Patent No.: US 10,890,785 B2
(45) Date of Patent: Jan. 12, 2021

(54) EYEGLASS TRANSLATING CLIP

(71) Applicant: Jeffrey J. Browen, Sioux Falls, SD (US)

(72) Inventor: Jeffrey J. Browen, Sioux Falls, SD (US)

( * ) Notice: Subject to any disclaimer, the term of this patent is extended or adjusted under 35 U.S.C. 154(b) by 95 days.

(21) Appl. No.: 15/988,585

(22) Filed: May 24, 2018

(65) Prior Publication Data

US 2018/0267336 A1 Sep. 20, 2018

Related U.S. Application Data

(60) Provisional application No. 62/511,018, filed on May 25, 2017.

(51) Int. Cl.
*G02C 11/00* (2006.01)
*G02C 5/04* (2006.01)
*G02C 5/12* (2006.01)
*G02C 11/04* (2006.01)

(52) U.S. Cl.
CPC ............... *G02C 11/00* (2013.01); *G02C 5/04* (2013.01); *G02C 5/124* (2013.01); *G02C 11/04* (2013.01)

(58) Field of Classification Search
CPC . G02C 3/02; G02C 3/003; G02C 3/04; G02C 2200/02; G02C 11/00; G02C 5/143; G02C 11/10; G02C 3/006; G02C 5/006; G02C 11/04; G02C 5/16; G02C 13/003; G02C 13/005; G02C 3/00; G02C 5/008; G02C 5/146; G02C 13/00; G02C 2200/10; G02C 5/06; G02C 5/08; G02C 5/18; G02C 5/20; G02C 7/10; G02C 9/00; G02C 9/04; G02C 11/02; G02C 11/08; G02C 13/001; G02C 2200/04; G02C 2200/20; G02C 5/128; G02C 5/14; G02C 5/22; G02C 7/06; G02C 7/066; G02C 7/086; G02C 7/14
USPC .......................................................... 351/155
See application file for complete search history.

(56) References Cited

U.S. PATENT DOCUMENTS

| | | |
|---|---|---|
| 2,220,000 A | 10/1940 | Mowrer |
| 2,267,997 A | 12/1941 | Spray |
| 2,298,832 A | 10/1942 | Mowrer |
| 2,446,725 A | 8/1948 | Seguin |
| 2,607,271 A | 8/1952 | Morse, Sr. |
| 2,612,076 A | 9/1952 | Dietz |
| 2,660,924 A | 12/1953 | Stegeman |
| 2,801,569 A | 8/1957 | Ralph |
| 2,842,029 A | 7/1958 | Roth |
| 2,986,971 A | 6/1961 | Jent |
| 3,087,383 A | 4/1963 | Ralph |
| 3,365,263 A | 1/1968 | Allen |

(Continued)

FOREIGN PATENT DOCUMENTS

| | | |
|---|---|---|
| DE | 10 2008 020 917 B4 | 11/2012 |
| GB | 2 267 358 A | 12/1993 |
| GB | 2 402 228 A | 12/2004 |

*Primary Examiner* — Collin X Beatty
*Assistant Examiner* — Grant A Gagnon
(74) *Attorney, Agent, or Firm* — Patterson Thuente Pedersen, P.A.

(57) ABSTRACT

A translating clip, including a clip on portion adapted to grippingly engage an eyeglass frame, an adjustment portion, and a nose bridge engaging portion. The adjustment portion enables adjustment of an engagement distance between a lower end of the nose engaging portion and the eyeglass frame.

10 Claims, 17 Drawing Sheets

(56) References Cited

U.S. PATENT DOCUMENTS

| | | | |
|---|---|---|---|
| 3,552,838 A | | 1/1971 | Hawks |
| 3,712,717 A | | 1/1973 | Stoloff |
| 4,178,080 A | | 12/1979 | Elder |
| 4,252,422 A | | 2/1981 | Speckhart |
| 4,280,758 A | | 7/1981 | Flader et al. |
| 4,470,674 A | | 9/1984 | Piampiano |
| 4,787,729 A | * | 11/1988 | Ruffen .................. G02C 5/122 351/131 |
| 5,159,359 A | | 10/1992 | Pauly et al. |
| 5,971,538 A | | 10/1999 | Heffner |
| 6,554,422 B2 | | 4/2003 | Bell |
| 7,591,555 B1 | | 9/2009 | Chen |
| 2002/0067461 A1 | | 6/2002 | Bell |
| 2015/0293381 A1 | * | 10/2015 | Mizuno .................. G02C 7/025 351/204 |
| 2017/0139228 A1 | * | 5/2017 | Singh .................... G02C 5/124 |

* cited by examiner

EYEGLASS TRANSLATING CLIP

CLAIM TO PRIORITY

This application claims the benefit of U.S. Provisional Application 62/511,018 filed on May 25, 2017 and entitled "Eyeglass Translating Clip" which is incorporated herein in its entirety by reference.

TECHNICAL FIELD

Embodiments of the invention generally relate to the field of corrective lenses for refractive error. More particularly, embodiments of the invention relate to the field of adjusting the height of single vision or multifocal spectacle lenses.

BACKGROUND

Bifocal lenses for spectacles are generally considered to have been invented by Benjamin Franklin more than 200 years ago. The basic principle of bifocal lenses is that an upper portion of the lens includes a prescription to correct refractive error for seeing at distance while a lower portion of the lens includes a prescription to correct refractive error for seeing at near. Bifocal lenses have changed and developed in many ways over time but this general principle remains true. Modern multifocal lenses include, for example, progressive addition lenses which have no visible bifocal lines and which have a gradual change in prescription from distance in the upper portion of the lens to near in the lower portion of lens. This transition in prescription occurs along a progressive column through which the visual axis of the eye travels in moving back and forth between the distance portion of lens in the near portion of the lens. The progressive column also includes an intermediate portion of the lens which includes a gradual change in prescription from distance to near to allow focusing at many different distances between distance and near by appropriate positioning of the head and the eyes.

Presbyopia involves the gradual loss of flexibility of the eyes to change focus from distance to near. The loss of ability to focus at near starts relatively early in life but, young children have a large excess of ability to focus from distance to near. Accordingly, most people begin to notice difficulty focusing on near objects between the ages of approximately 40 and 50. The loss of ability to focus to the point of needing assistance to focus at near is referred to as presbyopia. Presbyopia occurs because of a gradual loss of flexibility of the crystalline lens inside of the eye. Multifocal eyeglass lenses are a significant benefit to individuals experiencing presbyopia because they allow seeing a distance and near without the need to change prescriptions.

The benefits of multifocal lenses include the ability for persons with presbyopia to see at both distance and near without the need to change eyeglasses however, because the near prescription is in the lower portion of the lens this can create problems in certain circumstances. For example, if it is necessary to view near objects that are at or above eye level at a near distance uncomfortable contortions of positioning may be required in order to bring the near portion of the lens into alignment with the eye between the eye and the near object to be viewed. In some cases, for example when it is necessary to work on near objects that are overhead, it can be extremely difficult or even impossible to appropriately position the head, the eyes and the multifocal lens to view the near object clearly. In addition, people in the age group who have presbyopia generally require or at least benefit from having additional illumination under many circumstances.

A number of attempts to solve these problems are known to exist in the prior art. These efforts have generally included either an eyeglass frame with an adjustable bridge structure to allow the eye grass frame to be moved up and down relative to the eyes or a device that can be attached to the bridge of the eyeglass frame to facilitate raising of the eyeglass frame when it is desired to bring the lower portion of the multifocal lens to a higher location relative to the eyes to allow near viewing at eye level or above eye level.

Accordingly, there is still room for improvement in this art.

SUMMARY

Example embodiments of the invention solve many of the above discussed problems by providing a translating clip that allows for infinitely variable adjustment of the height of an eyeglass frame relative to the bridge of the nose and the eyes. The translating clip is infinitely adjustable within a particular range. This then allows adjustment of the near portion of multifocal eyeglass lenses to a substantial range of positions of height to accommodate many positioning needs to make use of the near or intermediate distance prescription at different locations.

Other example embodiments of the invention include a detachable/attachable or integrated illumination system for example including LEDs that are directable to illuminate a desired area in front of the wearer.

Example embodiments of the translating clip according to the invention include a clip having spring-loaded jaws which are cushioned, for example, by soft tubing around the jaws. The jaws are biased toward a closed position. A flexible member extends downwardly from the jaw member and terminates in a foot or pad that is angled inwardly. The foot or pad may be formed, for example from a silicone material or another polymer material. The foot or pad is configured to engage the bridge of the nose of the user in a comfortable and secure fashion.

With use of the translating clip the height of the eyeglasses and lenses relative to the eyes is easily controlled by placement of the jaws of the clip relative to the bridge of the eyeglasses. One application is in the area of computer usage. It is known that the use of bifocals, multifocal or progressive addition lenses require the user to tilt the head up for intermediate distance viewing. This can create discomfort and strain in the neck and shoulders as well as an overall tenseness of the body. Further when a multifocal spectacle user is required to shift their gaze between material on a desk and a computer screen there is a continuous need for adjustment of position to find their place on the written page on the desk. Embodiments of translating clip can be used to secure the proper focus for both activities and therefore allow the user to only turn their head from the paper on the desk back to the computer screen in order to see the appropriate parts of each. This allows the user to maintain their spine in a straighter orientation which is generally more comfortable and allows work to be done in a more relaxed and enjoyable fashion without less necessity for refocusing. Embodiments of the invention are expected to allow an improve posture for the user.

Example embodiments of the invention incorporating a light accessory mitigate the requirement to reposition the head when viewing things at or above eye level. Use of the light accessory also allows the hands to be free for working at or above eye level. Another application of embodiments of the invention includes reading in bed where it is often difficult to provide light on reading material so a partner in the same bed can sleep while reading it is done. Further embodiments incorporating the light accessory can also be clipped for example, to a shirt or an article of clothing, to provide hands-free illumination as well as safety when outdoors after dark.

Example embodiments of the invention are adaptable to fit nearly any eyeglass frame. It may be beneficial, according to embodiments of the invention, to supply a wider clip for plastic frames as compared to metal frames. The foot or pad, according to example embodiments of the invention, distributes weight on the bridge of the nose instead of on the sides of the nose minimizing discomfort and distributing the weight to bone structures of the face more than to soft-tissue. Embodiments of the invention permit the change of the nose pad to different sizes and shapes to facilitate application of the invention to many different structures of the bridge of the nose.

It is expected that embodiments of the invention will mitigate shoulder and overall body strain for users of computers. It is also expected that this would provide a significant boost to productivity either for workers on computers or for other applications such as workers on an assembly line. Increasing productivity and reducing repetitive stress injuries for workers may provide major benefits.

Example embodiments of the invention also include an adhesive device to secure the eyeglass transition clip to a computer screen or other screen or electronic device. Example embodiments of the invention also may include a surface upon which indicia such as logos or marketing messages may be placed.

Further example embodiments the invention may include a sliding translation device that allows the jaw portion to be adjusted relative to the foot portion in addition to or in place of adjusting the jaws to different locations on the bridge of the eyeglasses.

Embodiments of the invention are expected to be simple, easy to use, affordable and solve many of the above discussed problems.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
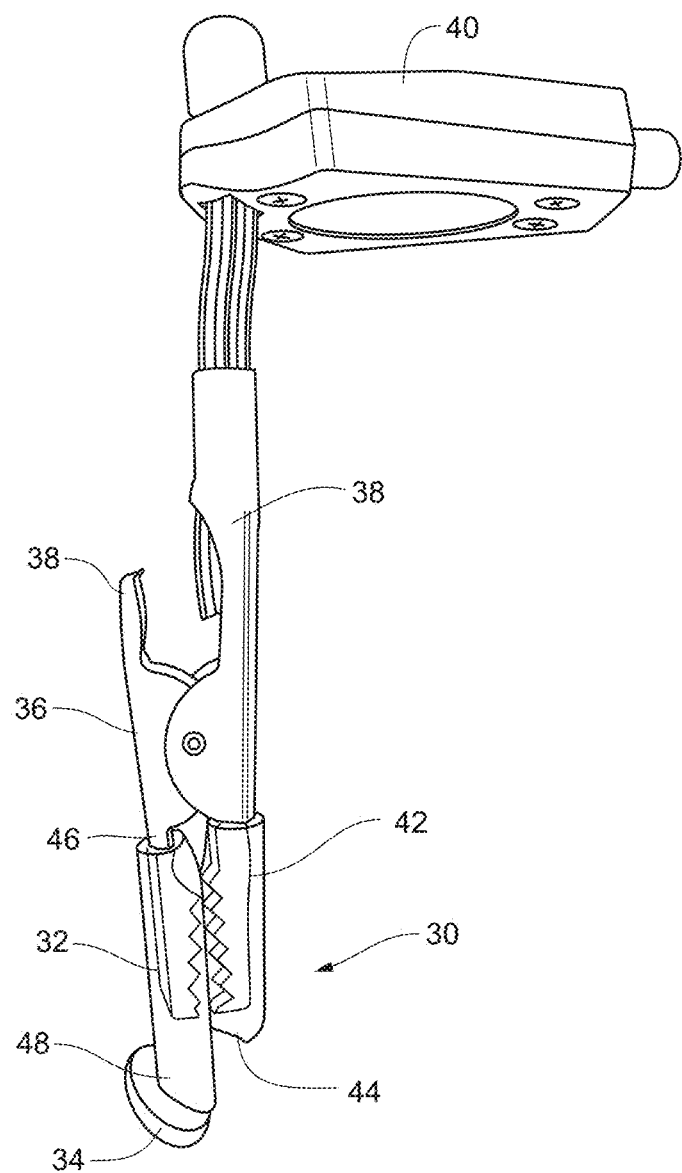
FIG. 1 is a photographic perspective view of an example embodiment of the invention including an illumination member.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring to FIGS. 1-29, several example embodiments of translating clip 30 are depicted.

Figure 2:
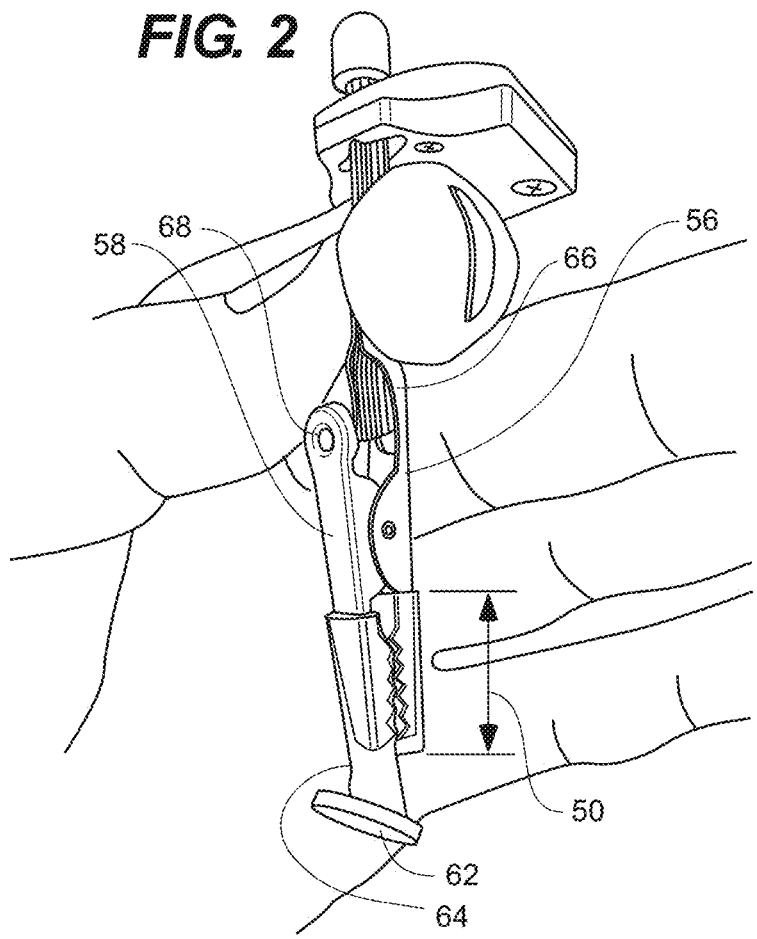
FIG. 2 is a photographic perspective view of the example embodiment of FIG. 1 from a different angle.

Referring particularly to FIGS. 1 and 2, in the depicted example embodiment translating clip 30 generally includes eyeglass bridge gripping portion 32, nose bridge pad portion 34, fulcrum portion 36, finger grips 38 and optional illuminator 40.

Eyeglass bridge gripping portion 32 generally includes jaws 42 which are covered by jaw cushions 44. Jaws 42 present fulcrum end 46 and opposing distal end 48. Between fulcrum end 46 and a distal end 48 extends throat depth distance 50. Throat depth distance 50 can be adjusted to provide a range of positioning distance 52 over which the height of eyeglasses 54 can be adjusted. Jaws 42 Include fixed jaw 56 and movable jaw 58. According to example embodiments of the invention, throat depth distance 50 is approximately equal to the length of a progressive addition lenses progressive column with which translating clip 30 is used. According to another example embodiment, throat depth distance 50 is approximately equal to the distance between the optical center of a spectacle lens and the center of the near or intermediate segment of the multifocal lens. According to a further example embodiment throat depth distance 50 is approximately equal to the distance between the distance optical center of the spectacle lens and a reading center of the spectacle lens. For example, throat depth distance 50 may equal approximately 22 mm. Throat depth distance 50 may encompass a range between 12 mm and 30 mm. According to another example embodiment, throat depth distance 50 may encompass a range between 15 and 25 mm. According to another example embodiment, throat depth distance 50 may encompass a range between 11 and 21 mm. This allows for sufficient vertical translational movement of a progressive addition lens to position any part of the progressive column in front of the eyes in the line of sight to allow for focusing at any distance between distance vision and the full progressive addition lenses near add. According to example embodiments of the invention throat depth distance 50 may be matched to the distance between a distance portion of a progressive addition lens and the center of the near portion of the progressive addition lens.

Nose bridge pad portion 34, in the depicted embodiment, is operably coupled to movable jaw 58 but may alternatively be coupled to fixed jaw 56. According to another example embodiment, nose bridge pad portion 34 may be coupled to fulcrum extension 60. Fulcrum extension 60 extends from fulcrum portion 36 in an opposing direction as compared to fixed jaw 56.

Nose bridge pad portion 34 generally includes bridge pad 62 and bridge pad coupler 64. Bridge pad 62 may be formed from a soft or semi rigid polymer material. For example, bridge pad 62 may be formed from a silicone polymer. Bridge pad 62 may be formed integrally with bridge pad coupler 64. Bridge pad coupler 64 is adapted to or structured to couple to movable jaw 58 according to the depicted example embodiment. Bridge pad coupler 64 may also be formed integrally with one of jaw cushions 44. While the depicted embodiment includes bridge pad coupler 64 extending from movable jaw 58 and integral with one of jaw cushions 44, bridge pad coupler 64 may also be coupled to fixed jaw 56 or to fulcrum extension 60.

In the depicted embodiment, finger grips 38 include fixed finger grip 66 and movable finger grip 68. Finger grips 38 each extend from fulcrum portion 36 and in the depicted embodiment are opposed to one another so that squeezing finger grips 38 together separates jaws 42 from each other.

Referring particularly to FIGS. 1-5, according to the depicted example embodiment optional illuminator 40 generally includes illuminator body 70, light source 72, flexible illuminator coupler 74 and on off switch 76. Illuminator body 70 houses light source 72 and on off switch 76. Illuminator body 70 also houses power supply (not shown) generally in the form of batteries (not shown). Illuminator body 70, in the depicted embodiment, is secured to fulcrum extension 60 by flexible illuminator coupler 74. In an example embodiment, flexible illuminator coupler 74 is formed of a material or material combination that can be bent to various positions but they will retain a position to which it is bent. Light source 70 may include one or more LEDs.

Figure 18:
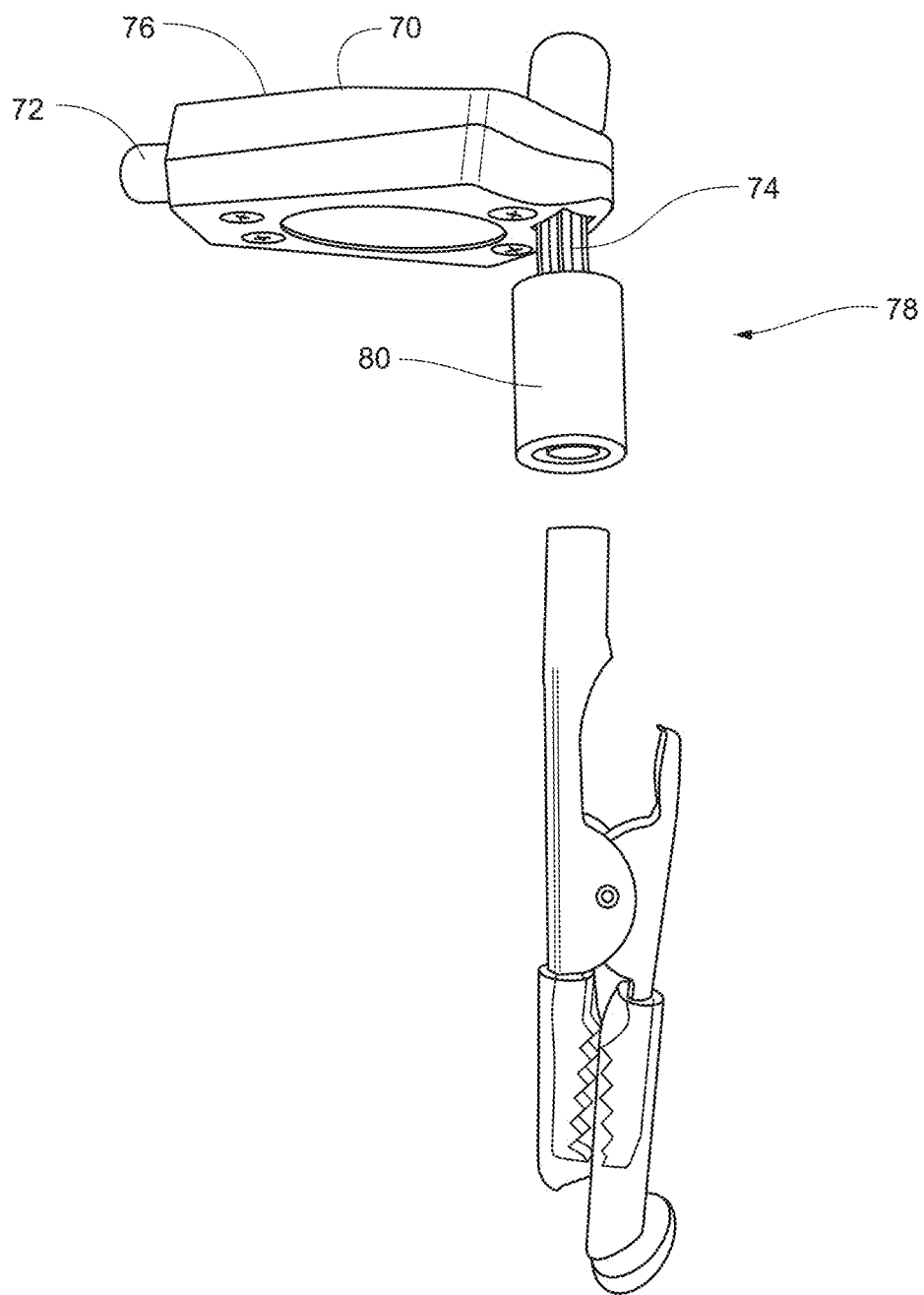
FIG. 18 is a photographic perspective view of a further embodiment of the invention in which a light member is detachable and attachable.
Figure 19:
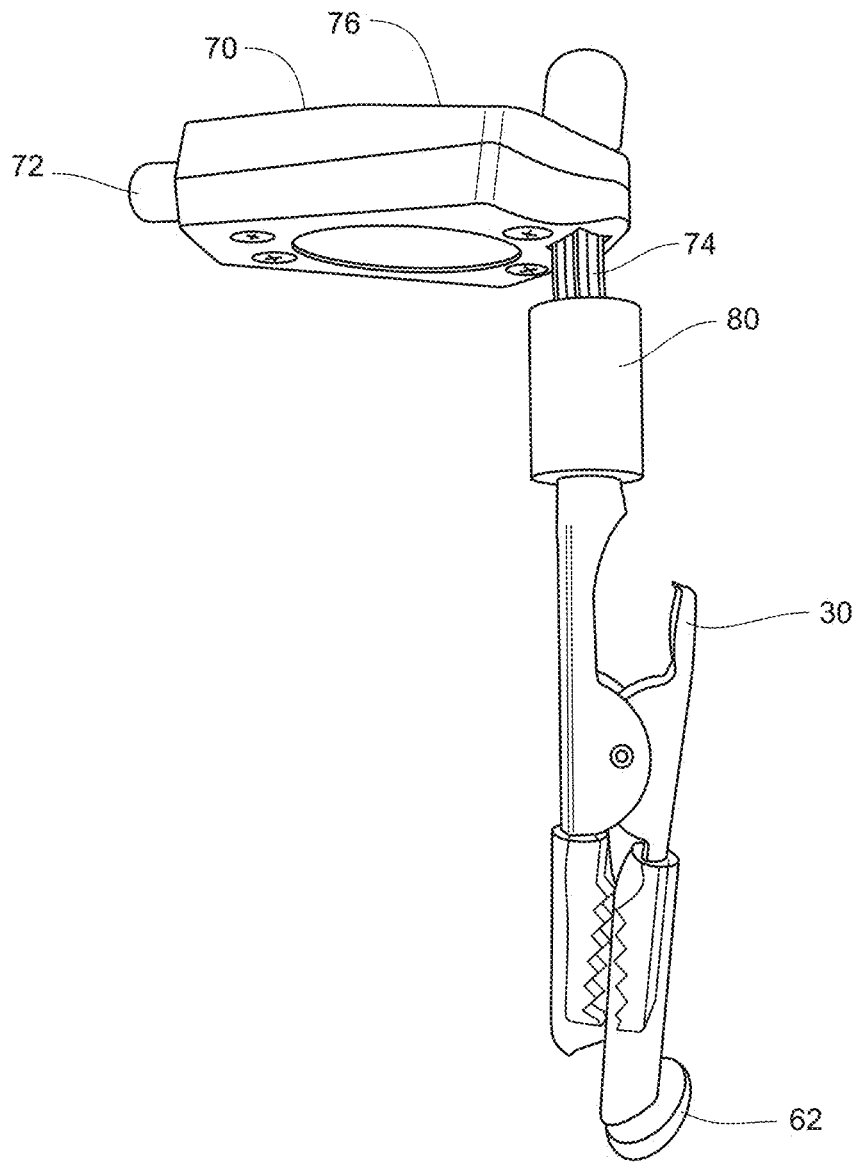
FIG. 19 is a photographic perspective view of the example embodiment of the invention of FIG. 17 from another viewing angle.

Referring particularly to FIGS. 18-19, detachable illuminator 78 is depicted. Detachable illuminator 78 is similar in structure to illuminator 40 but further includes illuminator coupler 80. Illuminator coupler 80 is structured to couple to both flexible illuminator coupler 74 and to fulcrum extension 60 in the depicted embodiment.

Figure 3:
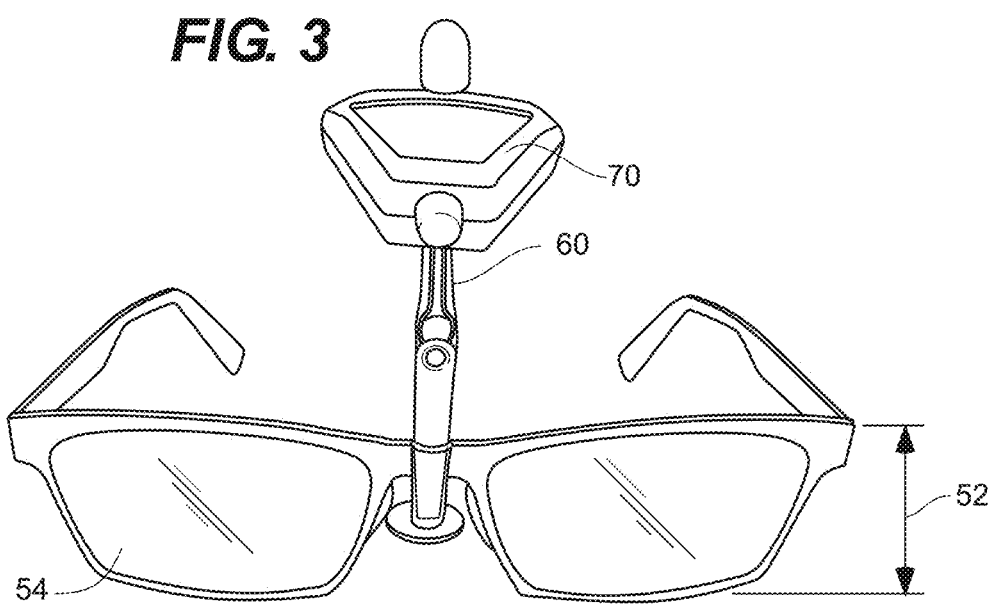
FIG. 3 is a photographic front perspective view of the example embodiment of FIG. 1 as utilized with a pair of eyeglasses.
Figure 4:
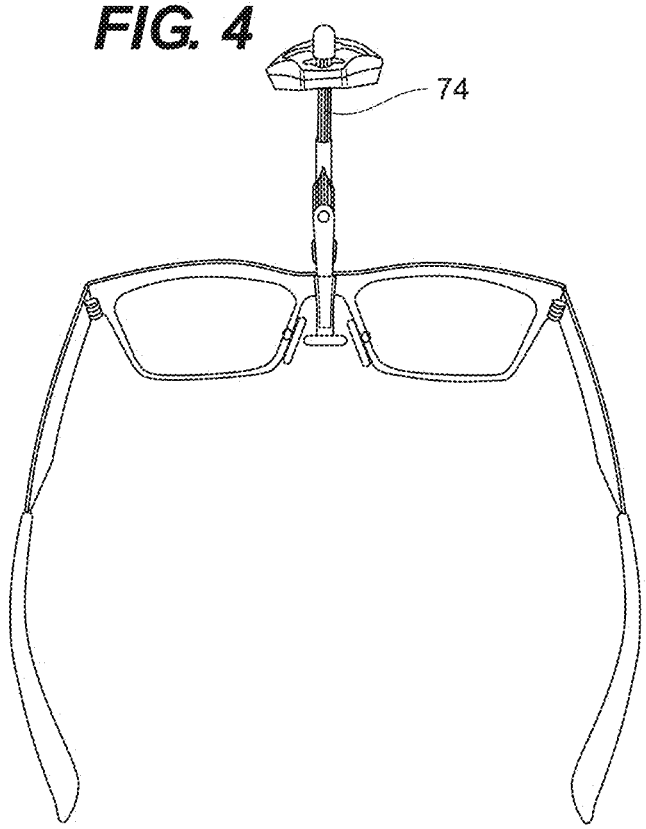
FIG. 4 is a photographic rear perspective view of the example embodiment of FIG. 1 as utilized with a pair of eyeglasses.
Figure 5:
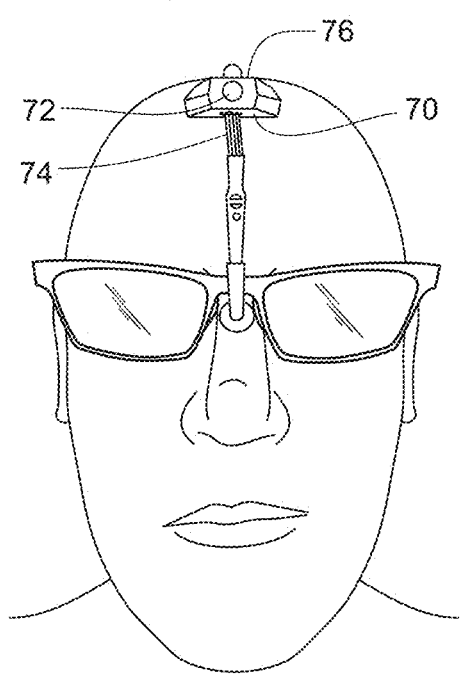
FIG. 5 is a photographic front perspective view of the example embodiment of FIG. 1 on the face of the user

Referring to FIGS. 3-4, translating clip 30 is depicted as used with eyeglasses 54. Translating clip 30 may be positioned to allow desirable positioning of eyeglasses 54 as depicted in FIG. 5. By placing translating clip 30 on the bridge of eyeglasses 54 within throat depth distance 50 at various locations the height of eyeglasses 54 can be adjusted relative to the user's eyes.

Figure 6:
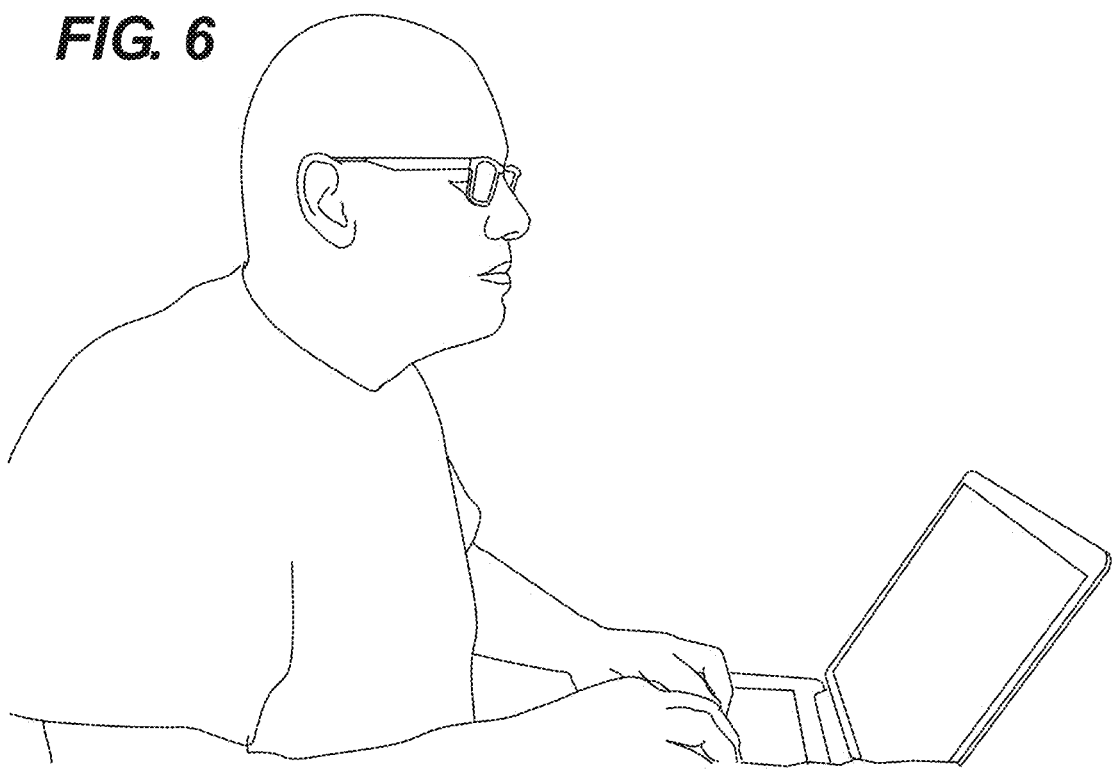
FIGS. 6 and 7 are photographic perspective views demonstrating postural changes required to use a progressive addition spectacle lens without the invention.
Figure 7:

FIGS. 6-7 depict the often uncomfortable positions that a user of multifocal or progressive addition lenses must assume in order to take best advantage of the focusing options available in the lenses.

Figure 8:
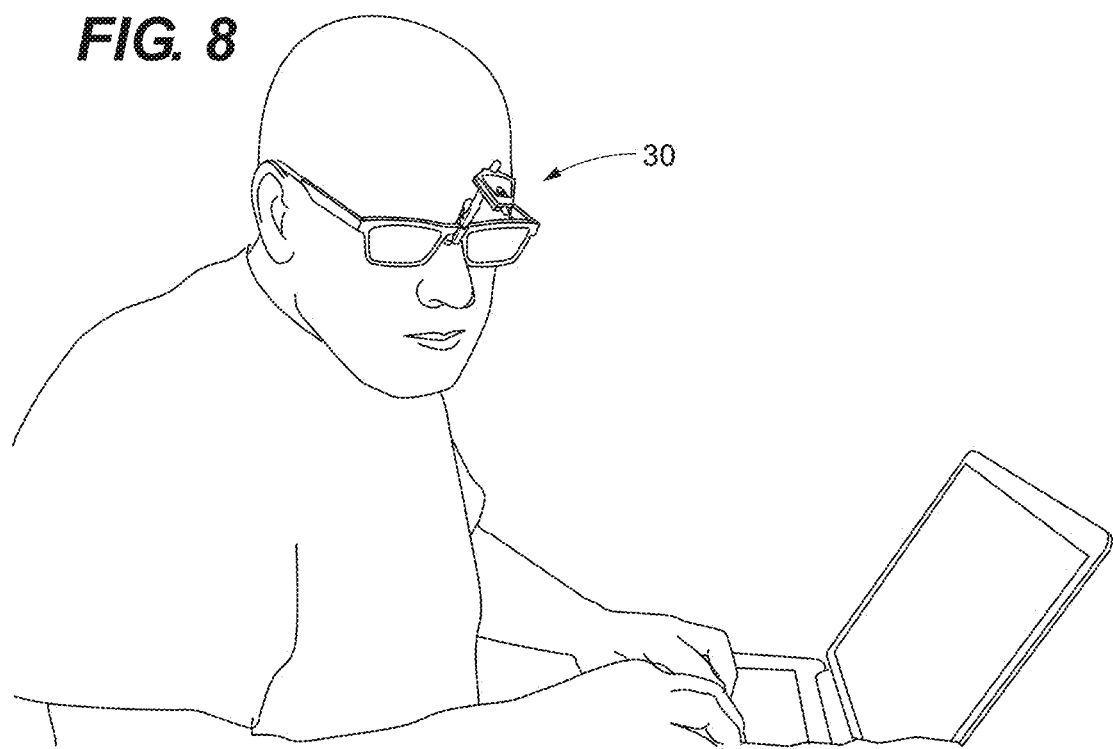
FIGS. 8 and 9 are photographic perspective views demonstrating improved posture when using embodiments of the invention with a progressive addition spectacle lens.
Figure 9:
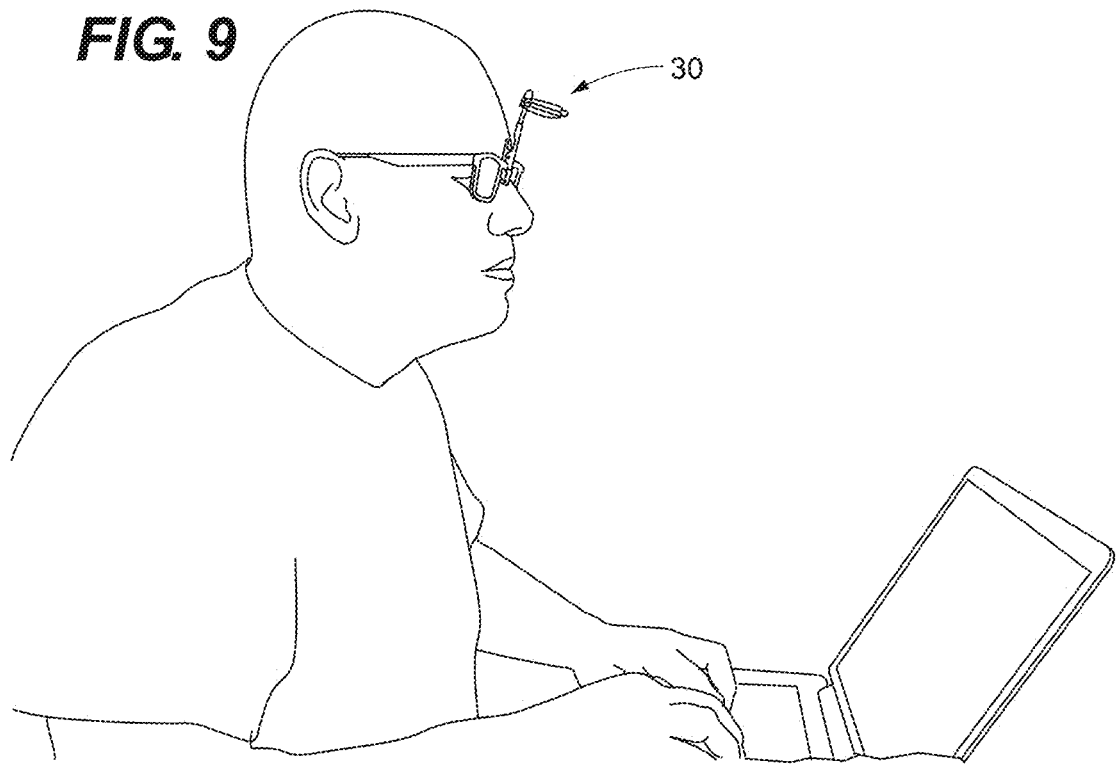

FIGS. 8-9 depict the improve posture that a user of multifocal or progressive addition lenses is able to assume because of the benefits of the embodiments the invention described herein.

Figure 10:
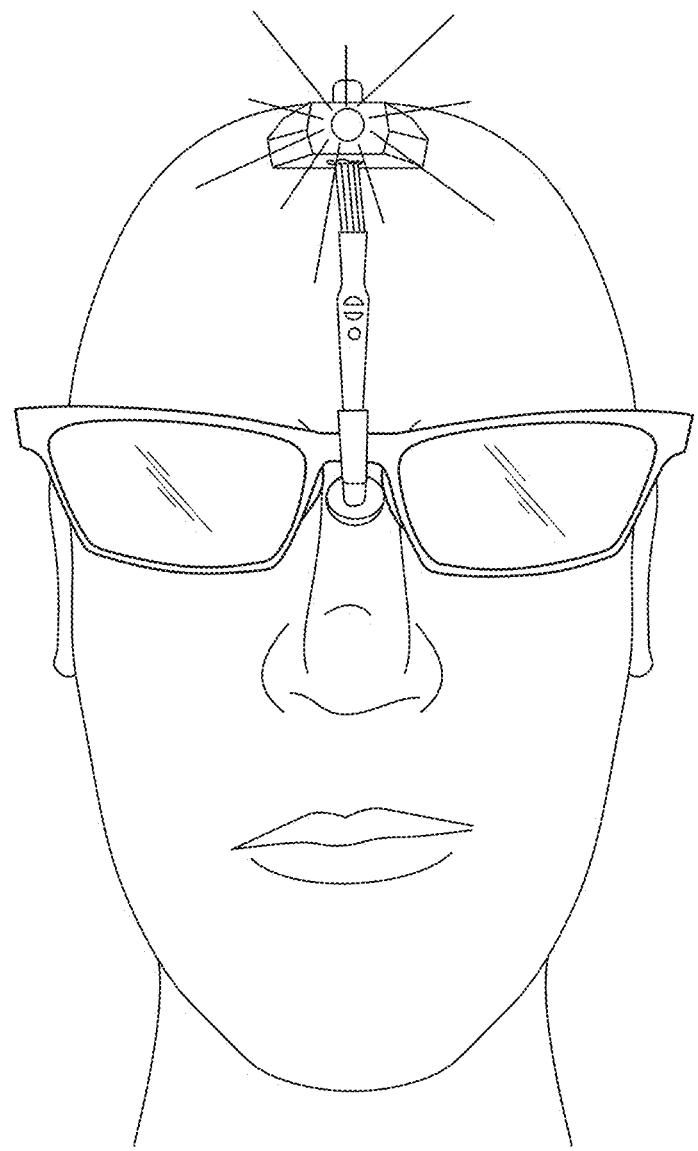
FIG. 10 is a photographic perspective view of an example embodiment the invention with the illumination member illuminated.

FIG. 10 depicts a benefit accrued by the use of illuminator 40 in a dark environment.

Figure 11:
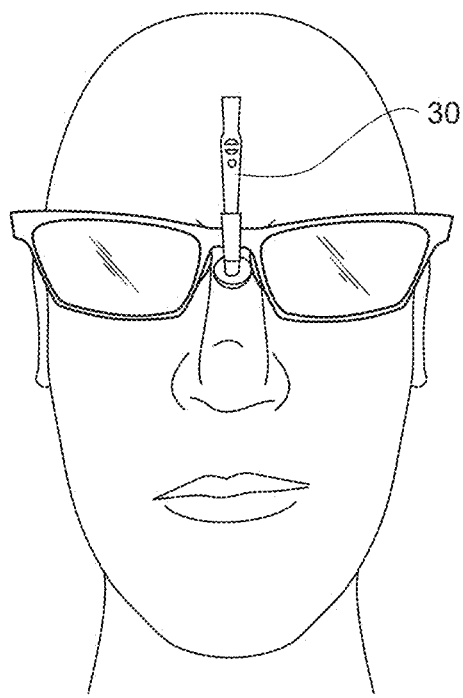
FIG. 11 is a photographic perspective view of another example embodiment of the invention when used on the face of a user.

FIG. 11 depicts a way in which translating clip 30 may be stored on eyeglasses 54 when not in use.

Figure 12:
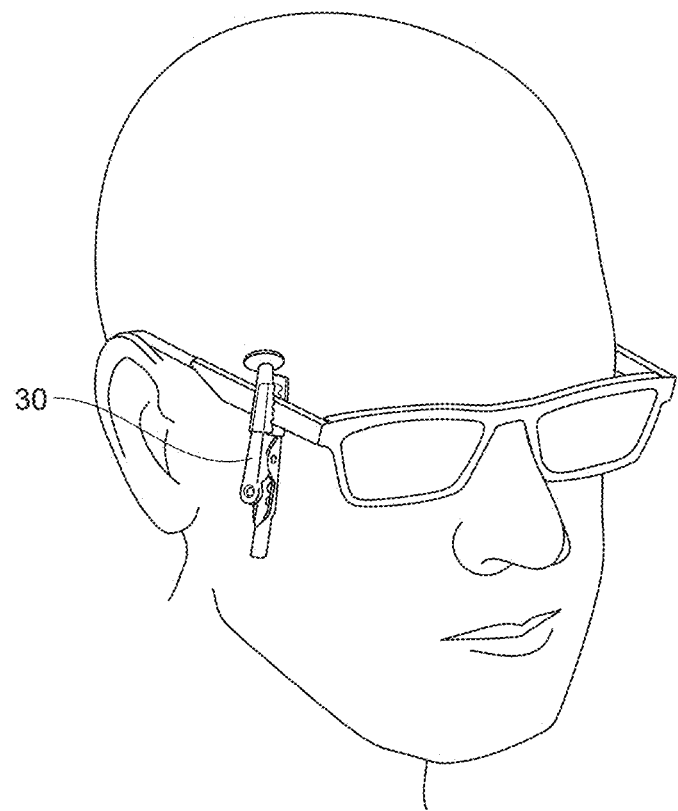
FIG. 12 is a perspective view of an option for storing an embodiment of the invention when not in use.
Figure 13:
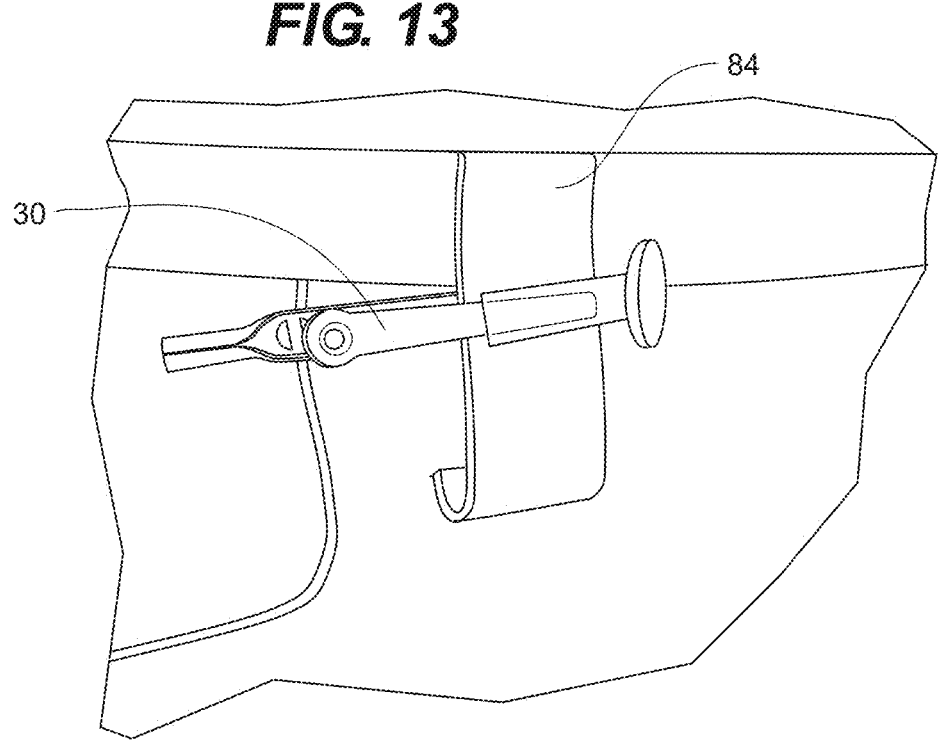
FIG. 13 is a perspective view of a further option for storing an embodiment of the invention when not in use.
Figure 14:
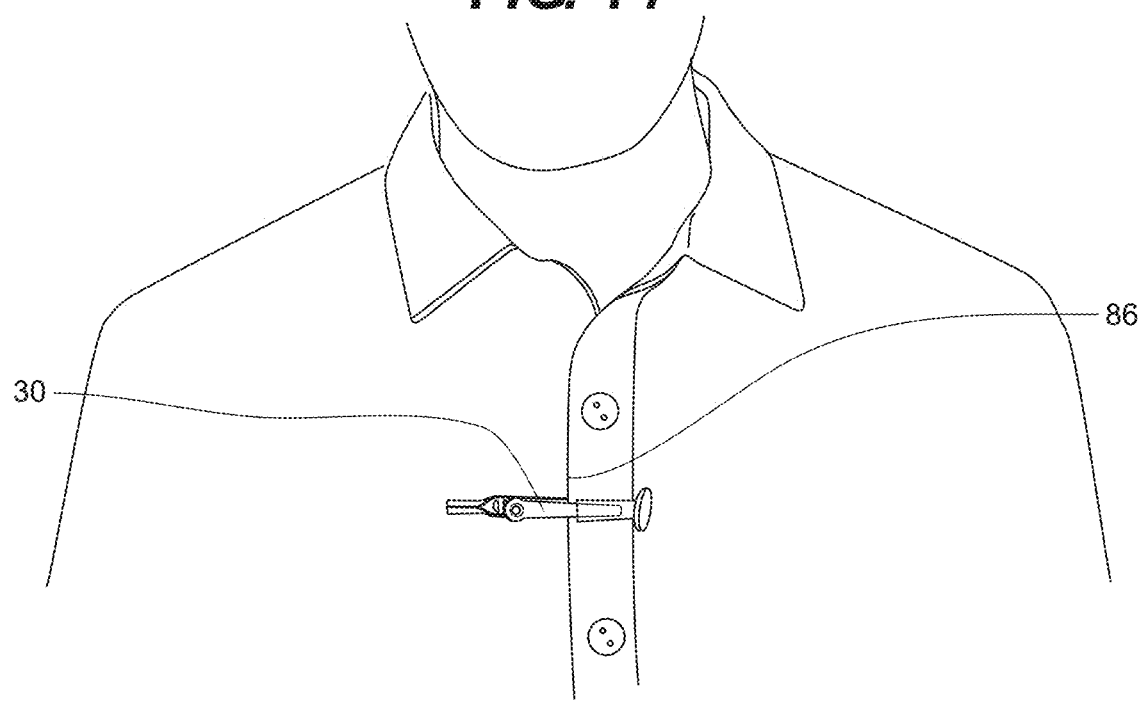
FIG. 14 is a perspective view of a further option for storing an embodiment of the invention when not in use.
Figure 15:
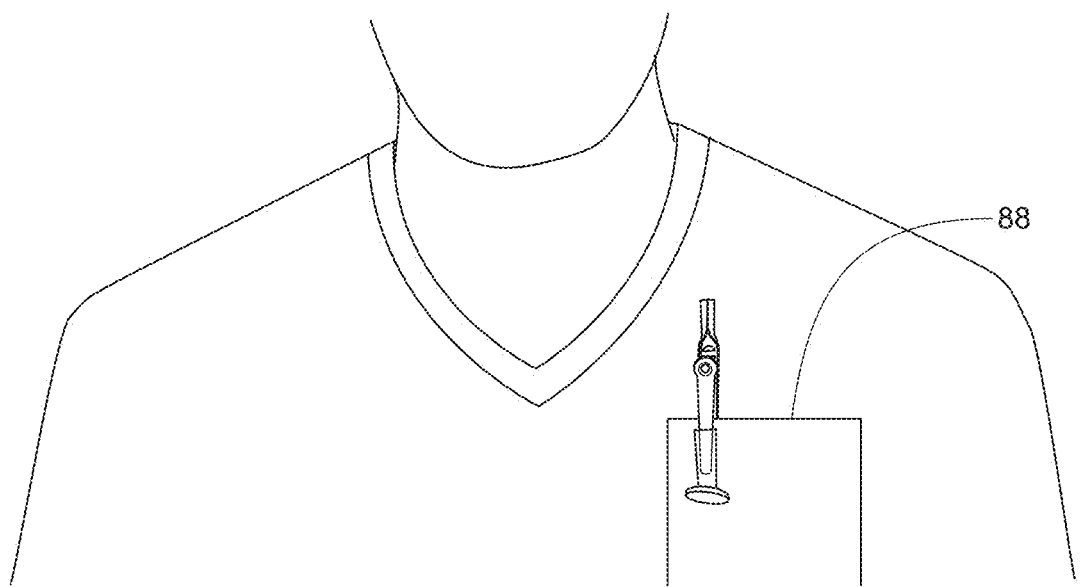
FIG. 15 is a perspective view of a further option for storing an embodiment of the invention when not in use.

FIG. 12 depicts another way in which translating clip 30 may be stored on eyeglasses 54 when not in use.

Figure 16:
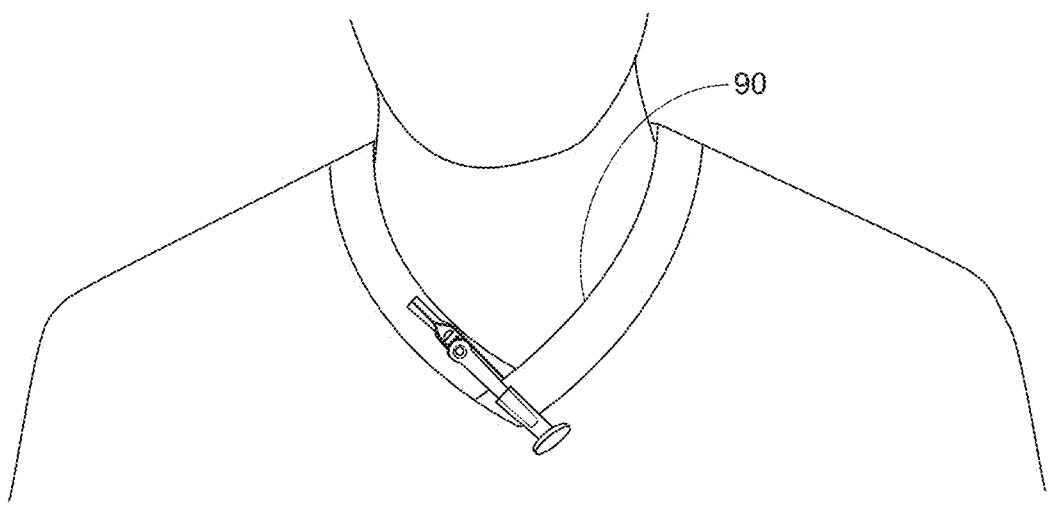
FIG. 16 is a perspective view of a further option for storing an embodiment of the invention when not in use.

FIGS. 13-16 depict various ways in which translating clip 30 may be stored by securing it to items of clothing 82 when not in use while still keeping translating clip 30 conveniently available. For example, translating clip 30 may be clipped to a belt loop 84 (FIG. 13), a shirt placket 86 (FIG. 14), a shirt pocket 88 (FIG. 15) or a shirt collar 90 (FIG. 16).

Figure 17:
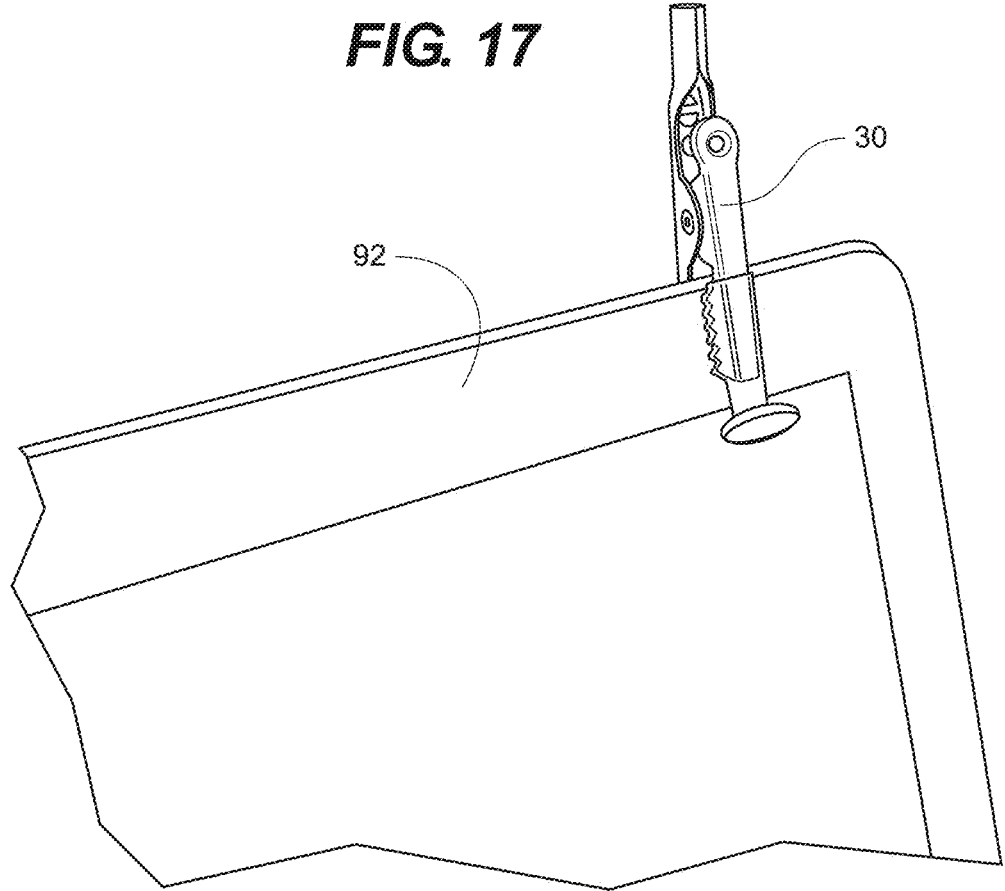
FIG. 17 is a photographic perspective view of a further option for storing an embodiment of the invention on an electronic device when not in use.

FIG. 17 depicts a way in which translating clip 30 may be stored by securing it to an electronic device 92.

Figure 20:
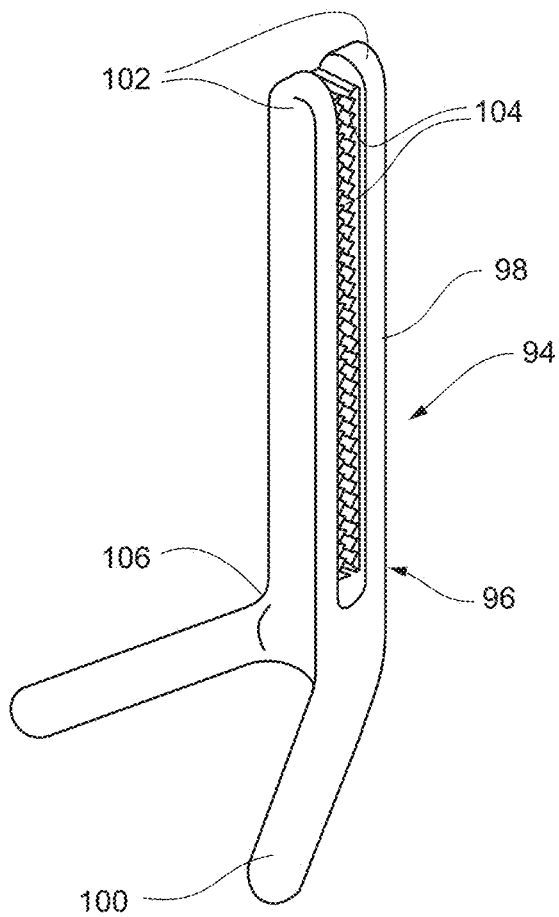
FIG. 20 is a side elevational view of a resilient translating clip according to an example embodiment of the invention.
Figure 21:
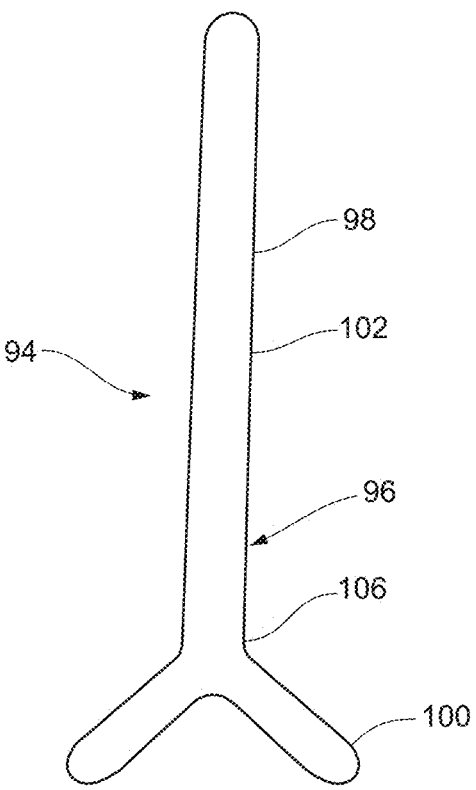
FIG. 21 is a front elevational view of the resilient translating clip of FIG. 20.

FIGS. 20-21 depict another example embodiment of the invention. The depicted embodiment can be formed as a unitary molded single piece structure. Resilient translating clip 94 generally includes unitary body 96. Unitary body 96 includes bridge gripping portion 98 and nose bridge pad portion 100. Unitary body 96 may be formed by for example, injection molding or other polymer molding techniques. Unitary body 96 may also be formed of a sufficiently resilient metal by known methods of metal fabrication.

Bridge gripping portion 98 generally includes resilient jaws 102 including jaw cushions 104. Resilient jaws 102 are coupled to nose bridge pad portion 100 by coupling member 106.

Nose bridge pad portion 100 is adapted to rest on the bridge of the nose of the wearer and may be formed in a curved fashion to conform to contours of the bridge of the nose. Nose bridge pad portion 100 may also be tilted to more comfortably accommodate the bridge of the nose of the wearer.

Example embodiments of the invention further include a method of adjusting the height of eyeglasses 54. The method includes securing translating clip 32 to eyeglasses 54 by inserting bridge of eyeglasses 54 into bridge gripping portion 32 to secure jaws 42 to eyeglasses 54. The position of eyeglasses 54 within jaws 42 can be adjusted by relocating them within throat depth distance 50. Accordingly positioning distance 52 of eyeglasses 54 may be adjusted in a distance equal to throat depth distance 50.

The method may further include securing detachable illuminator 78 to translating clip 30. Whether illuminator 40 is utilized or detachable illuminator 78 is utilized the method may include adjusting position of illuminator 40 or detachable illuminator 78 by bending flexible illuminator coupler 74. Thus the light can be directed as desired.

The method may further include when translating clip 30 is not in use, securing translating clip 32 item of clothing 82 or electronic device 92.

The method may further include securing translating clip to 30 to belt loop 84, shirt placket 86, shirt pocket 88 or shirt collar 90 when translating clip 32 is not in use.

The method may further include securing translating clip 30 to electronic device 92 when not in use.

Figure 22:
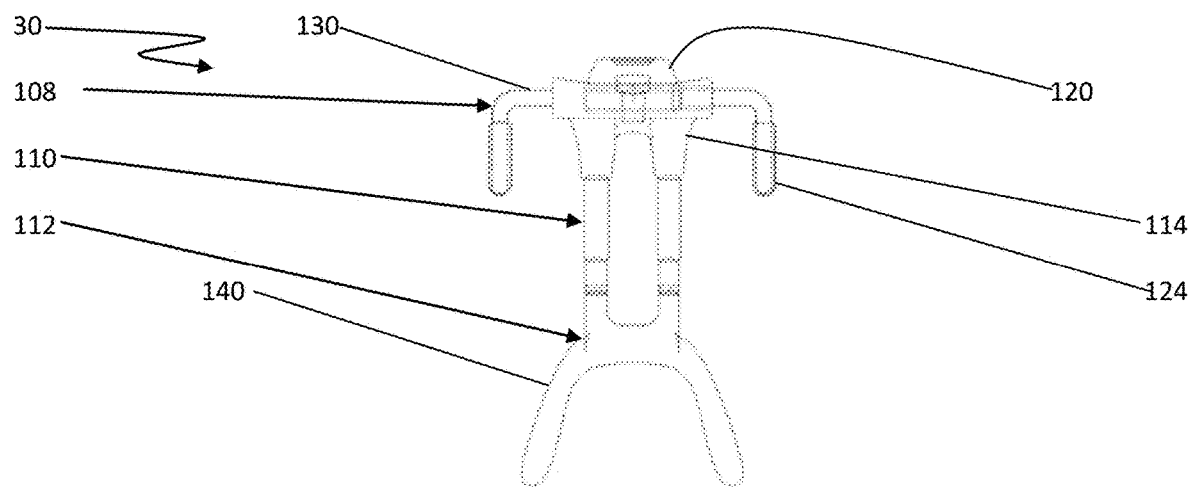
FIG. 22 is a front elevational view of a translating clip according to an example embodiment of the invention.

Referring to FIG. 22 a further example embodiment of translating clip 30 is depicted. In this example embodiment translating clip 30 generally includes clip on portion 108, telescoping adjustment portion 110 and interchangeable bridge portion 112.

Figure 23:
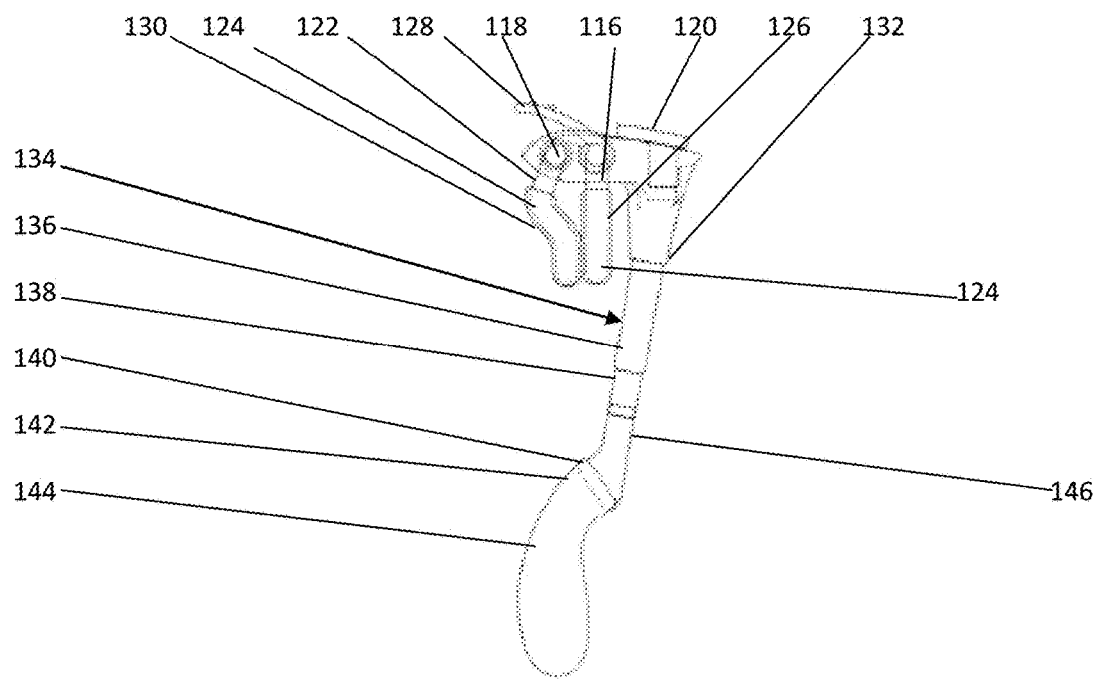
FIG. 23 is a side elevational view of the translating clip of FIG. 22.
Figure 24:
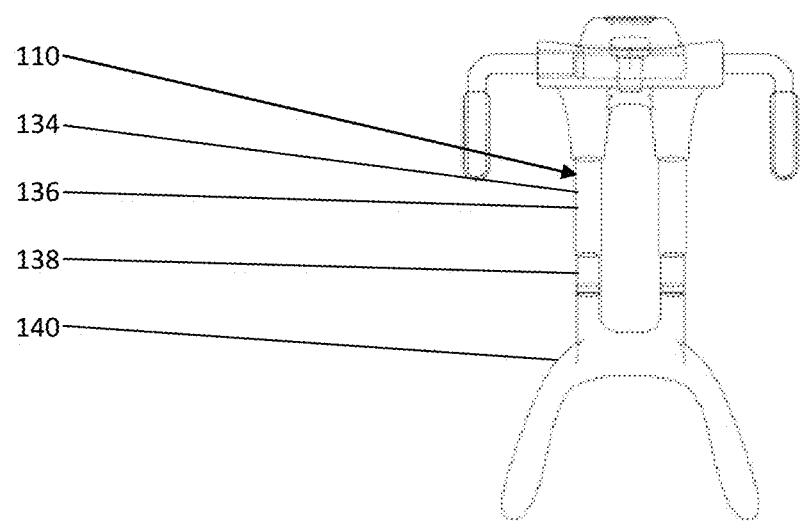
FIG. 24 is a back elevational view of the translating clip of FIG. 22.
Figure 25:
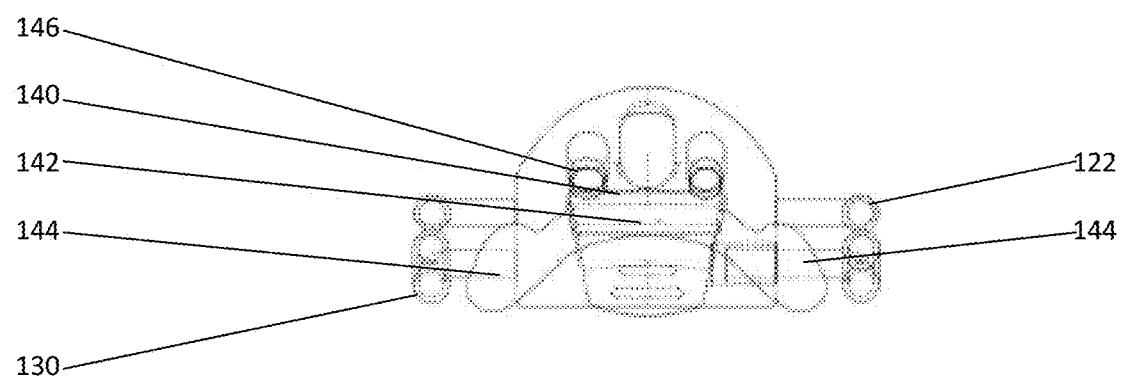
FIG. 25 is a bottom plan view the translating clip of FIG. 22.
Figure 26:
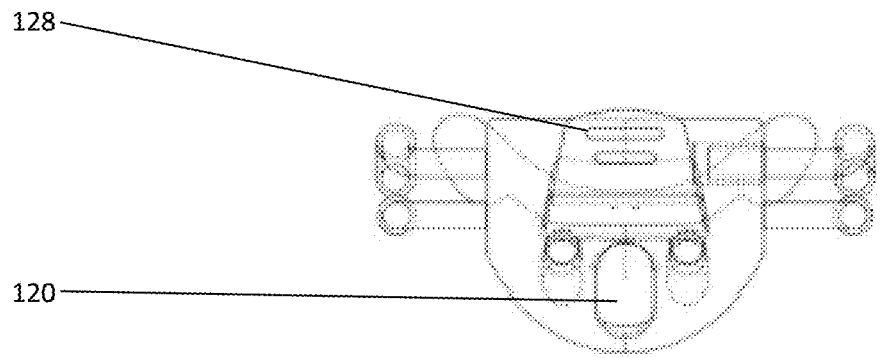
FIG. 26 is a top plan view of the translating clip of FIG. 22.

Referring also to FIGS. 23 and 24, clip on portion 108 further includes clip on body 114, fixed clip portion 116, movable clip portion 118 and light engaging portion 120. Fixed clip portion 116 is coupled to clip on body 114 and to movable clip portion 118. Movable clip portion 118 is located adjacent to fixed clip portion 116 and is biased toward fixed clip portion 116 for example by a spring. Light engaging portion 120 is secured to or may be formed integrally with clip on body 114.

Referring particularly to FIG. 23, fixed clip portion 116 generally includes two fixed arms 122 that extend outwardly and downwardly and that terminated in cushioned portions 124. One fixed arm 122 may be present in some embodiments. Cushioned portions 124 are adapted to make contact with a spectacle frame or lens without marring the frame or lenses.

Movable clip portion 118 is located adjacent to fixed clip portion 116 and is biased toward fixed clip portion 116. Movable clip portion 118 includes frame gripping portion 126 and finger engaging portion 128 and in the depicted embodiment is rotatable about hinge 129. Frame gripping portion 126 includes two movable arms 130 generally similar to fixed arms 122 and oriented opposed thereto. One movable arm 130 may be present in some embodiments. Movable arms 130 include cushioned portions 124 similar to fixed arms 122 and are adapted not to mar a frame or lenses.

Clip portion body 114 is also coupled to or integrally formed to include light engaging portion 120 and telescope engaging portion 132.

Referring particularly to FIGS. 22, 23 and 24, telescoping adjustment portion 110 generally includes at least one, for example two telescoping members 134. Telescoping members 134 include, for example, external sleeves 136 and internal members 138. External sleeves 136 may receive internal members 138 in a friction fit or may be engaged in other ways to allow adjustment to different positions while maintaining those positions following adjustment.

Interchangeable bridge portion 112 includes interchangeable bridge 140. Interchangeable bridge 140 further includes bridge portion 142, nose pad portions 144 and bridge telescope engaging portion 146. Interchangeable bridge 140 is structured so that it can be removed and replaced if worn or for fitting purposes. Interchangeable bridge 140 can include structures of various sizes and shapes, for example, to accommodate the bridge structure of wearers.

Figure 27:
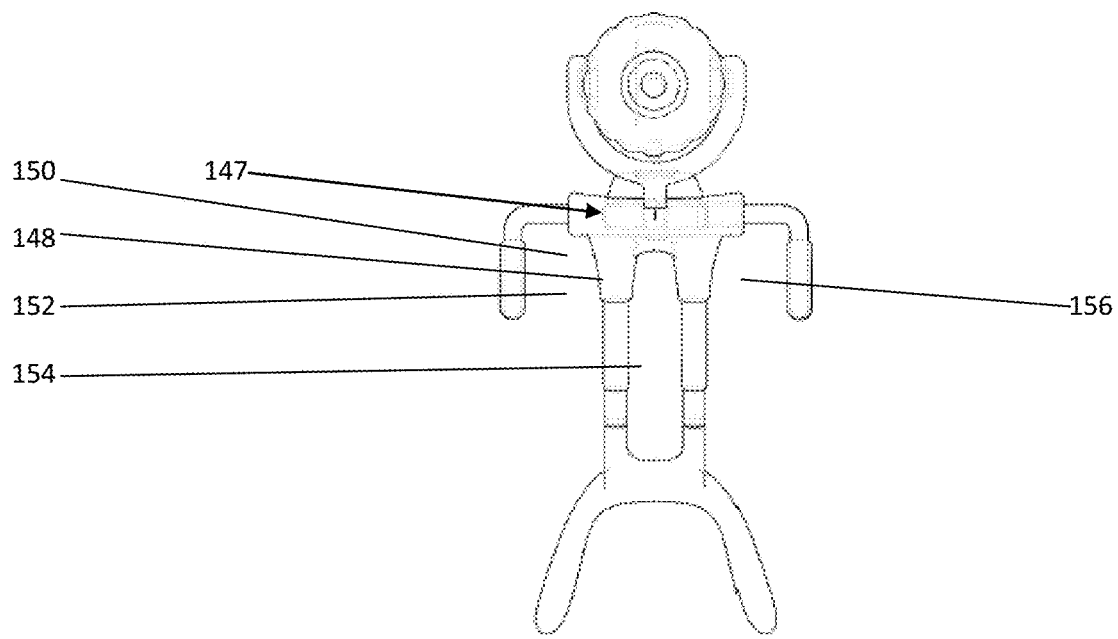
FIG. 27 is a front elevational view of the translating clip of FIG. 22 further including an optional removable worklight operably coupled to the translating clip according to an example embodiment of the invention.
Figure 28:
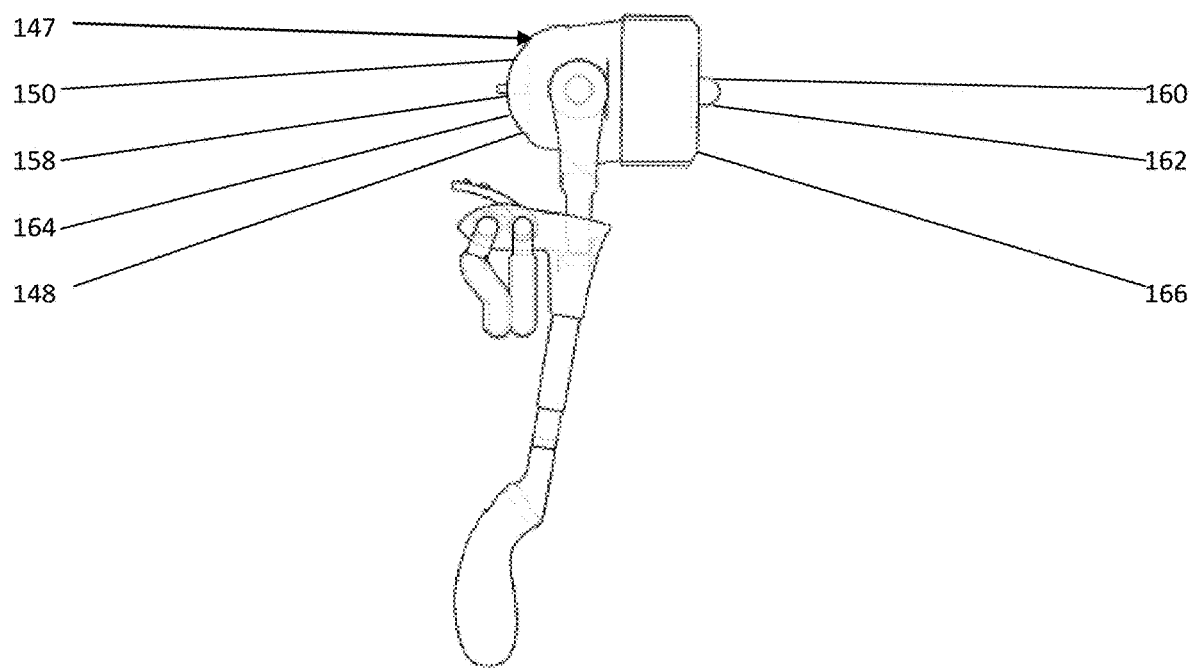
FIG. 28 is a side elevational view of the translating clip of FIG. 27.
Figure 29:
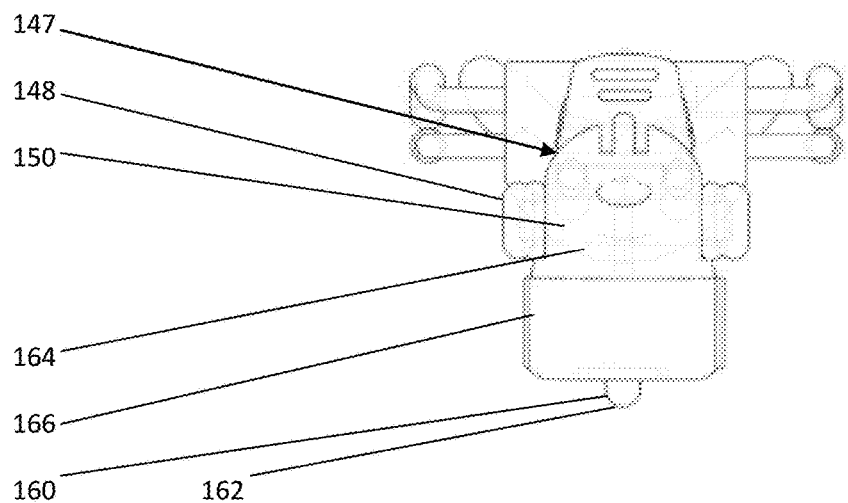
FIG. 29 is a top plan view of the translating clip of FIG. 27.

Referring to FIGS. 27, 28 and 29, according to another example embodiment of the invention, translating clip 30 optionally includes removable worklight 147. In the depicted embodiment, removable worklight 147 generally includes yoke portion 148 and light portion 150.

Yoke portion 148 includes light engaging portion 152 and clip engaging portion 154.

Light engaging portion 152 may include Y-structure 156 and is adapted to engage light portion 150 so that light portion 150 may be rotated about a generally horizontal axis.

Clip engaging portion 154 is adapted to engage with clip portion body 114, for example, in a friction fit such that yoke portion 148 may be rotatable relative to clip portion body 114 about a generally vertical axis.

Referring particularly to FIG. 27, light portion 150 generally includes battery compartment 158 and illumination source 160.

Battery compartment 158, for example, encloses batteries (not shown). Batteries (not shown) may include button type batteries for example of a silver oxide type or nickel metal hydride type. Batteries (not shown) may be disposable or rechargeable. Battery compartment 158 is also structured to engage yoke portion 148, for example, in a friction fit relationship so that the battery compartment 158 and illumination source 160 are rotatable relative to yoke portion 148 about a generally horizontal axis while yoke portion 148 is rotatable about a generally vertical axis.

Illumination source 160 may, for example, include light emitting diode (LED) 162 or another known or to be developed illumination source 160. Battery compartment 158 may include battery compartment enclosure 164 and battery compartment cover 166. In the depicted embodiment, battery compartment cover 166 also supports illumination source 160.

In operation, referring to FIGS. 1-5, translating clip 30 is applied to a bridge of a pair of eyeglasses. Force is applied to finger grips 38 such that jaws 42 open so that jaws 42 can be engaged to eyeglasses 54. Jaw cushions 44 are placed in contact with eyeglasses 54 such that nose bridge pad portion 34 can be engaged to a bridge of the nose. Jaws 42 can be adjusted to engage eyeglasses 54 at different locations within jaws 42 in order to adjust the height of eyeglasses 54 relative to the eyes. Referring now to FIGS. 6-9, it can be seen that without translating clip 30 it can be necessary to raise the chin and head to a position that is uncomfortable because it requires extension or hyperextension of the neck.

Referring particularly to FIGS. 1, 3-5 and 10 illuminator 40 may be secured to translating clip 30 to provide additional illumination as required or desired.

Referring particularly to FIGS. 1-17, translating clip 30 may be stored when not in use by applying it to various structures including eyeglasses 54, item of clothing 82, or electronic devices 92. Item of clothing 82 can be selected, for example from a group including belt loop 84 shirt placket 86 shirt pocket 88 and shirt collar 90.

Referring to FIGS. 20 and 21 resilient translating clip 94 may be utilized in a similar fashion to translating clip 30.

Referring particularly to FIGS. 22-29, in the depicted embodiment, fixed clip portion 116 and movable clip portion 118 can be opened by applying force to frame gripping portion 126 via finger engaging portion 128 so that movable arms 130 separate. Accordingly, clip on portion 108 is applied to eyeglass frame 54. Interchangeable bridge portion 112 can be positioned on a bridge of the user's nose. Telescoping adjustment portion 110 can be adjusted, for example, by sliding external sleeves 136 over telescoping members 134. Thus, a relative position of clip-on portion 108 and interchangeable bridge portion 112 may be adjusted as desired to position eyeglasses 54 at a desirable height. External sleeves 136 and telescoping members 134 may be engaged in a friction fit or in other adjustable arrangements known to those skilled in the art.

Interchangeable bridge portion 112 can be exchanged to appropriately fit a bridge of the nose of the user or to replace interchangeable bridge portion 112 if it is worn or soiled.

When supplemental illumination is desired, yoke portion 148 may be coupled to light engaging portion 120. This may be accomplished by a friction fit or other mechanical coupling known to those skilled in the art. Yoke portion 148 may then be adjusted about a generally vertical axis to direct illumination source 160 as desired from side to side and battery compartment 158 may be adjusted relative to yoke portion 148 around a generally horizontal axis to further direct illumination source 160 as desired. When it is necessary or desired, battery compartment enclosure 164 may be separated from battery compartment cover 166 to provide access to batteries (not shown) as needed for insertion and removal or replacement of batteries (not shown).

Illumination source 160, notably, can be directed above or below the normal line of sight to direct illumination as desired. According to one contemplated use, eyeglass frame 54 may be elevated and illumination source 160 can be directed above the line of sight to facilitate viewing, reading or working on overhead structures.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A translating clip, comprising:
   a clip on portion adapted to grippingly engage an eyeglass frame wherein the clip on portion further comprises an eyeglass gripping structure including two arms resiliently biased toward one another and structured to engage the eyeglass frame at two regions on either side of a bridge the eyeglass frame including a first eyeglass gripping portion structured to engage a right lens or right eyewire and a second eyeglass gripping portion structured to engage a left lens or left eyewire;
   an adjustment portion;
   a nose bridge engaging portion; and
   an illuminator emitting visible light removably coupleable to the translating clip
   wherein the adjustment portion enables adjustment of an engagement distance between a lower end of the nose engaging portion and the eyeglass gripping structure.

2. The translating clip as claimed in claim 1, wherein the nose bridge engaging portion further comprises an interchangeable bridge portion.

3. The translating clip as claimed in claim 1, wherein the clip-on portion further comprises a fixed clip portion and a movable clip portion structured to grip the eyeglass frame on either side of a bridge of the eyeglass frame.

4. The translating clip as claimed in claim 1, wherein the adjustment portion further comprises a telescoping structure adjustable between a greater length position and a lesser length position and adapted to be secured in a plurality of positions between the greater length position and the lesser length position.

5. The translating clip as claimed in claim 4, wherein the adjustment portion further comprises mutually slidably engaged structures that are fixable in a plurality of relative locations by a friction fit between the greater length position and the lesser length position.

6. A method of adjusting position of an eyeglass frame worn on a nose, comprising:
   applying a clip on portion to grippingly engage the eyeglass frame utilizing an eyeglass gripping structure of the clip-on portion including arms resiliently biased toward one another to engage the eyeglass frame at two regions on either side of a bridge the eyeglass frame including a first eyeglass gripping portion structured to engage a right lens or right eyewire and a second eyeglass gripping portion structured to engage a left lens or left eyewire;
   positioning a nose bridge engaging portion on a bridge of the nose;
   adjusting an adjustment portion to alter an engagement distance between a lower end of the nose engaging portion and the eyeglass gripping structure; and
   coupling a removable illuminator emitting visible light to the translating clip.

7. The method as claimed in claim 6, further comprising utilizing two opposed jaws of the clip-on portion which are resiliently biased toward one another to engage the eyeglass frame at a central region of a bridge of the eyeglass frame.

8. The method as claimed in claim 6, further comprising adjusting the adjustment portion by operation of a telescoping structure adjustable between a greater length position and a lesser length position and securing the telescoping structure one of a plurality of positions between the greater length position and the lesser length position.

9. The method as claimed in claim 6, further comprising exchanging a first interchangeable bridge portion the nose bridge engaging portion for a second interchangeable bridge portion of the nose bridge engaging portion.

10. The method as claimed in claim 6, further comprising sliding mutually slidably engaged structures relative to one another and fixing the mutually slidably engaged structures in at least one of a plurality of relative positions between the greater length position and the lesser length position by a friction fit.

\* \* \* \* \*